No. 823,040. PATENTED JUNE 12, 1906.
J. R. FRENCH.
AUTOMATIC SAFETY TROLLEY POLE.
APPLICATION FILED MAR. 3, 1905.

Witnesses:
Frank L. A. Graham.
G. T. Hackley.

Inventor:
John R. French.
by Townsend Bros.
attys.

UNITED STATES PATENT OFFICE.

JOHN R. FRENCH, OF LOS ANGELES, CALIFORNIA.

AUTOMATIC SAFETY TROLLEY-POLE.

No. 823,040.      Specification of Letters Patent.      Patented June 12, 1906.

Application filed March 3, 1905. Serial No. 248,194.

To all whom it may concern:

Be it known that I, JOHN R. FRENCH, a citizen of the United States, residing at Los Angeles, in the county of Los Angeles and State of California, have invented a new and useful Automatic Safety Trolley-Pole, of which the following is a specification.

This invention relates to that class of trolley-poles which when the trolley flies from the wire are automatically lowered; and the main object of the present invention is to provide a simple construction which is effective in operation, of low cost, and durable in use.

Figure 1:
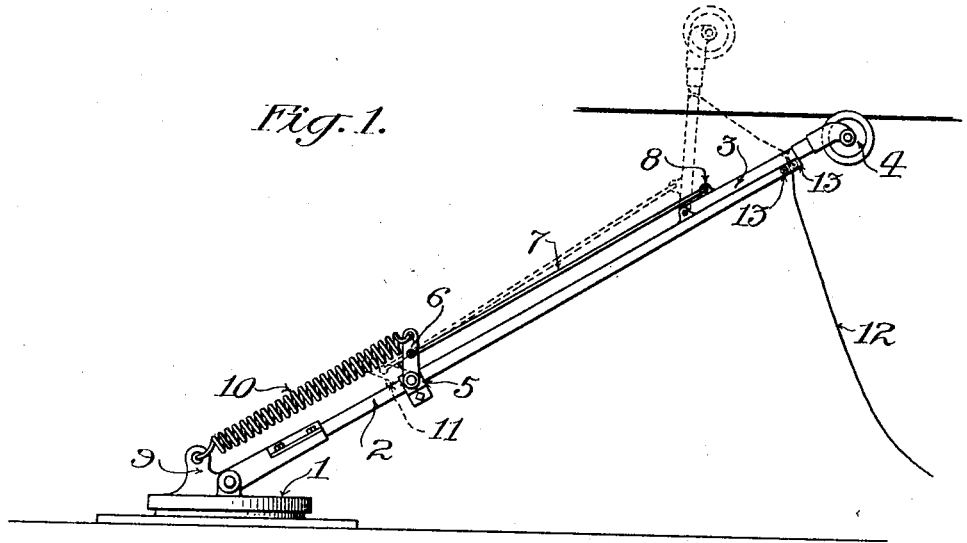
Figure 2:
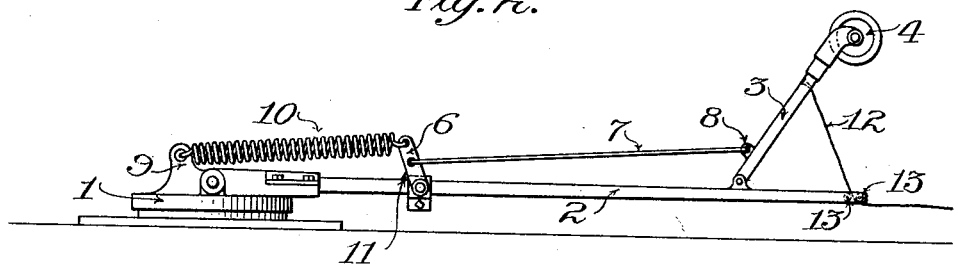
Figure 3:
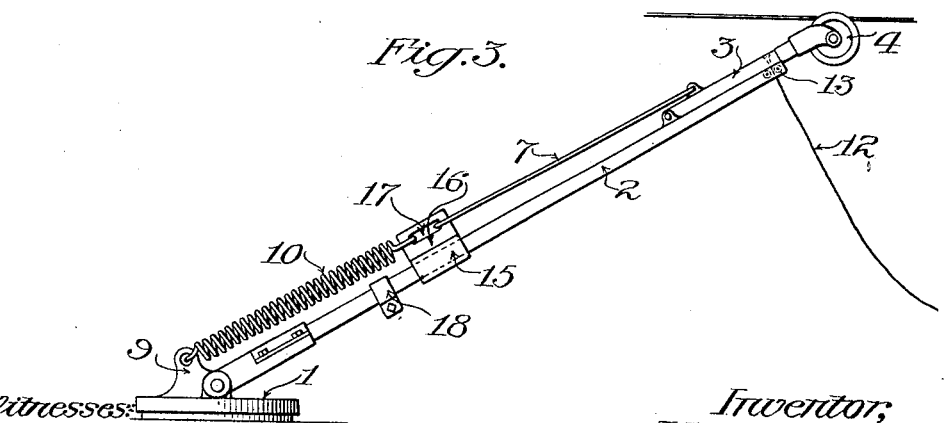

The accompanying drawings illustrate the invention, and, referring thereto, Figure 1 is a side elevation showing one form of the invention with the trolley resting against the wire. Fig. 2 is a view similar to Fig. 1, showing the pole dropped. Fig. 3 is a side elevation of another form.

1 designates a revoluble base mounted on the top of the car. Pivoted to the base is a trolley-pole 2, near the upper end of which is pivoted a trolley-carrier 3, which carries the trolley 4. At an intermediate point on the pole is a clip 5, to which is pivoted a lever 6. The lever 6 is connected by a rod or wire 7 with an ear 8 on the trolley-carrier 3. The base 1 has an ear 9, to which one end of a supporting-spring 10 is connected, the other end of the spring 10 being connected to the lever 6.

When the trolley-carrier 3 lies flat against the pole, as shown in Fig. 1, so that the ear 8 lies about in line with the pivot of the trolley-carrier, the spring 10 is maintained under a tension sufficient to hold the trolley firmly against the wire. As the ear 8 lies a trifle above the pivot of the trolley-carrier it is obvious that there is a tendency of the trolley-carrier to fly up from the pole; but it is prevented from doing so by reason of the trolley being held down by the wire. When the trolley flies from the wire, the spring pulls it up into the position shown in dotted lines in Fig. 1, which at the same time relaxes the spring and allows the trolley-pole and parts to drop into the position shown in Fig. 2.

The lever 6 has an abutment 11, which strikes against the pole when the lever is pulled completely back, so that just before the pole reaches its lowest position the lever stretches the spring slightly, which results in cushioning the drop of the pole, so that it settles softly into place.

Attached to the trolley-carrier is a trolley-rope 12, which passes between sheaves 13 on the trolley-pole. By pulling the trolley-rope 12 the trolley-carrier may be flattened down against the trolley-pole, which will again stretch the spring 10 and cause the trolley-pole to be lifted again into position with the trolley against the wire.

Fig. 3 shows another form in which a sleeve 15 is employed in place of the lever 6. The sleeve 15 is slidable along the trolley-pole and has a wing 16 with a slot 17. The rod or wire 7 engages in the other end. The cushioning of the downward drop of the pole is accomplished by a stop 18, against which the sleeve 15 strikes when the pole has nearly dropped and which by arresting the movement of the sleeve stretches the spring during the latter part of the drop of the pole.

What I claim is—

1. A base, a trolley-pole pivoted thereto, a trolley-carrier on the trolley-pole, a lever pivoted on said trolley-pole at a point between said base and trolley-carrier; a spring connected with the base and with the trolley-carrier by means of said lever and a connecting-link whereby the pole is supported by the spring when the trolley-carrier is in one position and is allowed to drop when the tension of the spring is lessened by the movement of the trolley-carrier relatively to the pole.

2. A base, a trolley-pole pivoted thereto, a trolley-carrier comprising a lever pivoted to the trolley-pole, a spring connected with the base, a rod connected with the trolley-carrier, and an intermediate device connected loosely with the pole and connected with the spring and rod.

3. A base, a trolley-pole pivoted thereto, a trolley-carrier on the trolley-pole, a spring connected with the base a rod connected with the trolley-carrier an intermediate lever pivotally mounted on the trolley-pole and connected with the said spring and rod, whereby the pole is supported by the spring when the trolley-carrier is in one position and is allowed to drop when the tension of the spring is lessened by the movement of the trolley-carrier relatively to the pole, an abutment for said lever, whereby when the pole has dropped a definite distance the tension of the spring is increased to cushion the pole through the remainder of its movement.

In testimony whereof I have hereunto set my hand, at Los Angeles, California, this 23d day of February, 1905.

JOHN R. FRENCH.

In presence of—
GEORGE T. HACKLEY,
TILLIE E. ADAM.